March 5, 1957 S. FÜRST 2,783,950
ACTUATION CONTROL ARRANGEMENT FOR WINDING MACHINES
Filed Nov. 19, 1953 3 Sheets-Sheet 1
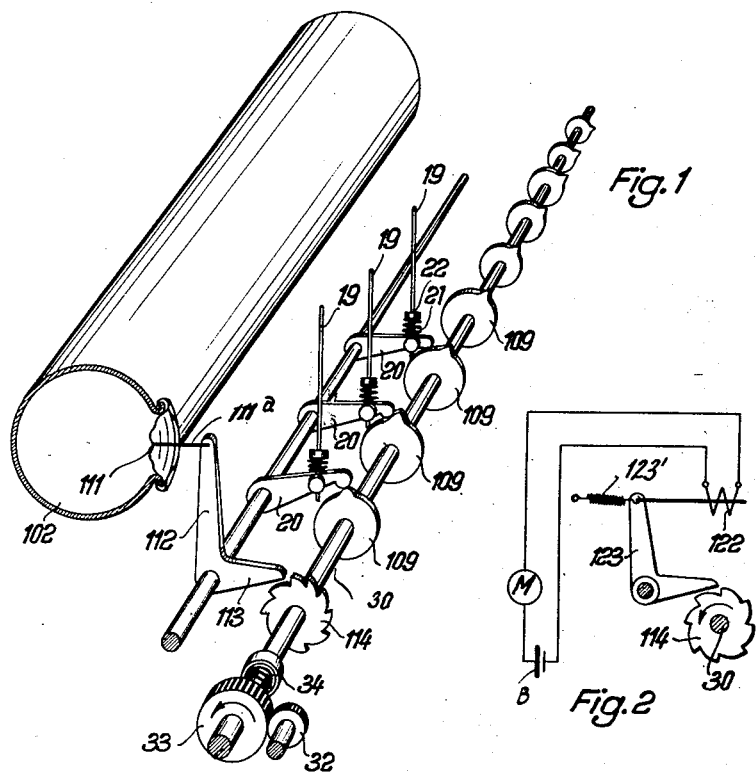
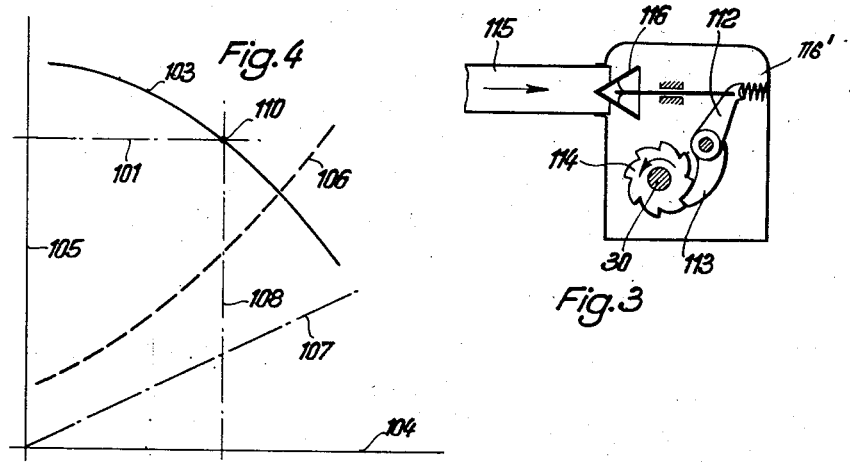
Inventor:
STEFAN FÜRST
BY:

March 5, 1957 S. FÜRST 2,783,950
ACTUATION CONTROL ARRANGEMENT FOR WINDING MACHINES
Filed Nov. 19, 1953 3 Sheets-Sheet 3

INVENTOR.
STEFAN FÜRST
BY

United States Patent Office 2,783,950
Patented Mar. 5, 1957

2,783,950

ACTUATION CONTROL ARRANGEMENT FOR WINDING MACHINES

Stefan Fürst, M. Gladbach, Rhineland, Germany, assignor to Walter Reiners, M. Gladbach, Rhineland, Germany Application November 19, 1953, Serial No. 393,149

Claims priority, application Germany July 3, 1951

10 Claims. (Cl. 242—35.5)

The present application is a continuation-in-part application of my copending application Ser. No. 296,135, filed June 28, 1952, now Patent 2,679,361, issued May 25, 1954.

The present invention relates to textile winding machines, and more particularly to an actuation control arrangement for a multiple spindle winding machine requiring at least partly independent operations, such as changing of spools, catching of thread ends by suction, marking, and so forth carried out at a plurality of operational stations.

For carrying out the operations frequently amounts of energy are required which are equal to or exceed the energy required for the normal winding operation. Since such special energy requirements are not continuous, but may become necessary at any operational station at any time, the means supplying energy to the winding machine must be so designed that the peak consumption can be furnished, since otherwise one or several operations may be only partly carried out, which of course is highly undesirable.

It is one object of the present invention to provide in a winding machine control means permitting actuation and operation of operational stations only when sufficient energy is available.

It is another object of the present invention to prevent actuation of additional operational stations when already operating stations consume all available energy.

It is still another object of the present invention to provide in a winding machine control means permitting simultaneous actuation of a number of operational stations requiring suction for whose operation sufficient energy can be supplied by an energy accumulating means, such as a container holding air at negative pressure, and by a source of energy, such as an exhauster, working at full capacity.

It is a further object of the present invention to provide in a winding machine having a plurality of operational stations consuming energy supplied by a source of energy, energy consumption representing means representing the amount of energy consumed by operating operational stations at any given time, and cooperating with actuation preventing means permitting actuation of further operational stations only if sufficient energy is available.

A still further object of the present invention is to provide as an energy accumulating means, such as a container containing air at a pressure different from atmospheric pressure.

With these objects in view, the present invention mainly consists in an actuation control apparatus for a winding machine comprising, in combination, a source of energy adapted to produce a predetermined amount of energy, a plurality of operational stations, each operational station being supplied with energy from the source of energy for carrying out independent non-continuous energy consuming operations, movable actuating means for actuating the operational stations to carry out the operations, energy checking means continuously checking whether the energy consumed by actuated operational stations exceeds the predetermined amount of energy, and movable operation control means connecting the energy checking means with the actuating means and preventing movement of the actuating means and actuation of operational stations by the actuating means when the energy checking means indicate that the energy consumed by actuated stations reaches the predetermined amount of energy available at the source of energy.

The method according to the present invention comprises, in combination, the steps of producing a predetermined amount of energy for carrying out independent non-continuous energy consuming operations, and determining whether sufficient energy for an operation is available before starting an operation.

According to the present invention preferably an energy accumulating means is provided which is capable of accumulating sufficient energy for carrying out one or several operations simultaneously so that it is possible to use a comparatively small source of energy since the energy accumulating means supplies the energy for peak consumption, and is charged with energy during times of low consumption.

On the other hand, it is undesirable to have an energy accumulating means of unnecessary great capacity since such construction would mean an uneconomic operation.

Consequently, according to the present invention the actuation of additional operational stations is only carried out if at the source of energy sufficient energy is left free by the already operating operational stations for carrying out further operations. Thereby an overload on the source of energy is prevented, and moreover it is assured that each additional operation can be fully carried out and completed.

Before any additional operation is started, the amount of available energy is checked. According to one method according to the present invention the available energy is measured, preferably together with the energy available from the source of energy operating at full capacity to determine whether sufficient energy is available. According to another method of the present invention after one or several operations have started at operational stations, the consumed energy is checked and measured, and compared to or deducted, respectively, from the known energy available from the energy accumulating means and the source of energy. The result determines the possibility of actuation of further operational stations.

According to a modified embodiment of the present invention, additional energy is automatically supplied when energy checking means find the available energy insufficient for additional operations.

Besides the checking or measuring of the available energy, the present invention also contemplates a measuring of energy components. For instance, the pressure in an air accumulating container means or in conduits associated therewith is checked, if an energy accumulator for a fluid such as air is used for providing suction or pressure at operational stations, or the amount of fluid such as air flowing through the conduits is checked. After these factors have been determined, the available energy can be found by means of other known factors, such as the volume.

According to another method of the present invention the entire power required for a drive motor producing the energy for operating operational stations is measured for determining the possibility of actuating additional operational stations.

According to another embodiment of the present invention the energy consumption of each operational station is represented by energy consumption representing means, such as electrical resistances. Whenever an operational station is actuated, an electric resistance is connected into a circuit in parallel to other resistances representing already operating operational stations, and the current flowing through all resistances representing operational stations is a measure for the energy consumed by the operating stations. When the total current exceeds a predetermined value, the actuation of additional operational stations is blocked by suitable means.

Energy consumption representing means, such as light rays, or pneumatic, hydraulic, and electric resistances are advantageously used for representing the energy consumption of pneumatic, hydraulic and mechanical devices. This method of the present invention is of particular advantage in the event that the individual energy consumptions of the operational stations are different since every resistance can be dimensioned, and if necessary adjusted, to permit passing of a current which exactly corresponds to, and represents, the energy required by a particular operational station.

The actuation of an operational station, for instance for changing spools, is preferably carried out in such manner that a continuously operating actuating means, which consecutively actuates the operational stations is blocked by operation control means whenever the available energy is insufficient, and is released when, and as long as, sufficient energy for at least one operation is available. In the event that the available energy is insufficient for carrying out a complete operation at an additional operational station, the control means prevents actuation of additional operational stations until the source of energy has supplied sufficient energy to the energy accumulating means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an isometric view of an embodiment of the present invention;

Fig. 2 is a fragmentary view of another embodiment of the present invention;

Fig. 3 is a modified embodiment of the present invention;

Fig. 4 is a diagram graphically illustrating the consumption of energy depending on the number of operating operational stations;

Figure 5:
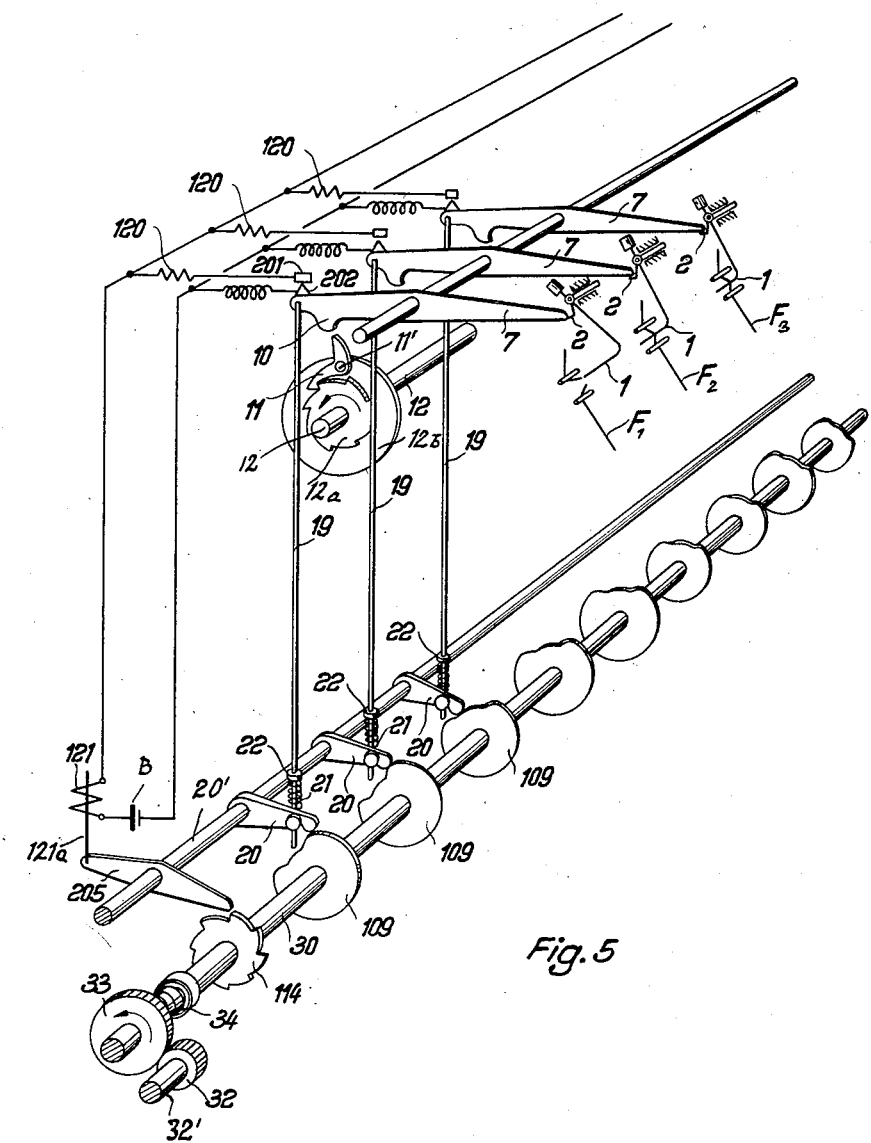
Fig. 5 is an isometric view illustrating a preferred embodiment of the present invention including energy consumption representing electric resistances.

Referring now to the drawings, and more particularly to Fig. 5, operational stations $F_1$, $F_2$, $F_3$ are shown in this figure as stations at which threads are checked by station checking means such as broken thread feelers 1 which are held in the position shown at stations $F_2$ and $F_3$ by the threads supplied to the machine, but pivot due to gravity into the position shown at the station $F_1$ when the thread breaks. An arresting lever 2 is fixedly connected to the broken thread feeler 1, and pivots with the same. The stations may be checked in a similar manner when frequent breakages occur in the threads, or for determining a required change of spools.

The sensing shaft 30 carries a set of cams 109, one cam 109 provided for each operational station F. The cam projections of the cams 109 are staggered so as to consecutively actuate the levers 20. The sensing shaft 30 is driven from a continuously rotating drive means 32' through gears 32, 33, and through a resilient coupling means 34.

During each revolution of the driven sensing shaft 30 the levers 20 are consecutively actuated to move upwardly. Each lever 20 engages one end of a spring 21 whose other end abuts against an abutment 22 which is fixed on an actuating rod 19. All levers 20 are pivotally mounted on the shaft 20' which also carries a blocking lever 205 cooperating with a fixed blocking wheel 114 on the sensing shaft 30.

The upper end of the actuating rods 19 are pivotally connected to a double arm lever 7 which is provided with a projection 10. In the normal inoperative position, illustrated for the operational stations $F_2$ and $F_3$, the actuating rods 19 cannot move and pivot the lever 7 when the lever 20 is actuated by the cam 109, since the arresting lever 2 arrests one arm of lever 7. Consequently the spring 21 is compressed. In the position illustrated for the operative and actuated operational station $F_1$, the broken thread feeler 1 and the arresting lever 2 have pivoted and permit pivoting of the lever 7 into the illustrated position in which the projection 10 has released the pawl 11 which causes rotation of the disk 12b by engaging the locking wheel 12a fixed on shaft 12. In the operative position of the levers 7 in which the same are blocked by the arresting levers 2, the projection 10 engages the pawl 11 and pivots the same into a releasing position. The locking wheel 12a is secured for rotation to a drive shaft 12, while the pivot pin 11' is secured to a disk 12b. The operating shaft 12 is in continuous rotation.

Consequently, whenever the pawl 11 is released by a projection 10 due to a breakage at the corresponding operational station, the drive shaft 12' is coupled to the operating disk 12b by the coupling means 11, 12a, 12b and an operation is carried out by means which are not shown in Fig. 5 for repairing the thread in the respective operational station.

In the event that the lever 7 is arrested by the arresting lever 2, no operation is carried out, although a lever 20 has been actuated by the associated cam 109 during the consecutive actuation of all levers 20.

From the above description it will be apparent that the elements 30, 109, 20, 19, 7, 11, 12a 12b and 12 control actuation means for the operational stations F.

In order to determine in accordance with the present invention, whether an operational station is to be actuated in addition to the already operating operational station in view of the available energy, energy consumption representing means are provided.

Electric resistances 120 are arranged in series with fixed contacts 201 and movable contacts 202 which are movable with the associated levers 7. The resistances 120 are connected in parallel in a circuit which also includes an electro-magnet means 121 and a source of electric current B. The core member 121a of the electromagnet means 121 is pivoted to the blocking lever 205 which is fixed on the shaft 20' and cooperates with the blocking wheel 114.

Each resistance 120 permits passing of a current corresponding to and representing the energy consumption of the associated operational station F. Levers 7 which are in the operative position shown for the operational station $F_1$, effect closing of the contacts 201, 202 so that a current flows through the associated electric resistance 120. Assuming that a certain number of operational stations are actuated, a corresponding number of contacts 201, 202 will be closed, and a corresponding number of electric resistances will be connected in parallel so that a current representing the energy consumption of all actuated and operative operational stations will flow through the electromagnet means 121 and tend to actuate the core member 121a. The electromagnet means 121 is so dimensioned that in the event that a number of operational stations is actuated and operative which consumes the entire available energy, the current in the electromagnet means 121 will be great enough to pivot the lever 205 and to block the sensing shaft 30 by means of the blocking wheel 114. Consequently, no further operational station is actuated. As soon as one of the operative operational stations is returned to the normal position illustrated for the stations $F_2$, $F_3$, the associated resistance 120 is disconnected by the associated contacts 201, 202, and the current in the electromagnet means 121 drops so that the blocking lever 205 releases the blocking wheel 114, and the shaft 30 starts rotating again for consecutively sensing the positions of the operational stations.

From the above description it will be apparent that the resistances 120 constitute energy consumption representing means, which together represent the consumed energy, and operate blocking means preventing actuation of additional stations when the available predetermined amount of energy is being consumed by operative operational stations.

Referring now to Fig. 1, the sensing shaft 30 is again driven from drive means by gears 32, 33 through a resilient coupling 34 and carries cams 109 for consecutive actuation of levers 20 which cooperate with actuating rods 19 which actuate the operating means of the operational stations in a manner similar as shown in Fig. 5. The operational stations are operated by suction, for instance for catching thread ends of broken threads, and a container 102 is provided as an energy accumulating means. A movable energy or pressure checking means, such as a diaphragm 111 is arranged in an opening of the container 102 and varies its position in accordance with the pressure in the container 102 with respect to the atmospheric pressure. An arm 111a connects the diaphragm 111 with the lever 112, 113 so that the same pivots corresponding to the pressure in the energy accumulating accumulator container 102.

Every operation at one of the operational stations requires suction, and therefore the negative pressure within the container 102 and corresponding to available energy is reduced as operational stations are actuated and become operative. When a predetermined number of operational stations is operative the available energy is reduced as the pressure in the container means is increased above a predetermined level. The diaphragm 111 moves outwardly and pivots the blocking lever 112, 113 into a blocking position engaging the blocking wheel 114 and blocking the sensing shaft 30. Consequently, no further stations are actuated as long as the negative pressure in the container 102 is insufficient for carrying out an operation in an additional operational station. As soon as the pressure in the container 102 is again reduced by the action of an exhauster, the diaphragm 111 moves inwardly under the action of the atmospheric pressure so that the lever 112, 113, releases the blocking wheel, and the sensing shaft 30 starts turning to consecutively sense all stations until an operational station requiring an operation is sensed, whereupon the station is actuated and the operation is carried out by suction action effected by the negative pressure in the container 102. It is understood that a similar arrangement can be operated by a container holding compressed air.

In the embodiment shown in Fig. 3 the available energy is not checked and ascertained by means of a pressure sensitive diaphragm, but by a flow meter 116 which is arranged in the air conduit 115, and blocks the sensing shaft 30 by means of a blocking lever 112, 113 which engages the blocking wheel 114 when the flow meter 116 reacts to a deviation of the flowing amount of air, which is an essential energy component, from the predetermined desired value. The pressure on the flow meter 116 is counteracted by the spring 116' acting on the lever arm 112.

In Fig. 2, an arrangement is illustrated according to which the motor M drives an exhauster which serves to produce suction at a set of operational stations in an arrangement similar to the embodiment shown in Fig. 1. The circuit of the electric motor M includes an electromagnet 122 and a source of electric energy B. When the current of the electric motor M exceeds a predetermined value, the electro-magnet 122 is sufficiently energized to pivot the lever 123 against the action of a spring 123' into a blocking position blocking the blocking wheel 114, and thereby the sensing shaft 30. The power required for running the motor is a measure of the available energy.

The exhauster arrangement is generally not designed to provide suction for any number of operational stations so that the negative pressure in the container or conduit means from which the operational stations are operated drops according to the graph 103 in Fig. 4 as the load increases. The abscissa 105 indicates the simultaneously operative operational stations. The ordinates of the graph 103 correspond to values of negative pressure, the ordinates of graph 106 indicate the motor power, and the ordinates of graph 107 indicate the amount of air depending on the number of simultaneously operating stations. In the point 110, for instance, the ordinate 108 of the graph 103 indicates the negative pressure in the container 102 in the event that eight operational stations are operative, as indicated by the abscissa 101.

Figure 6:
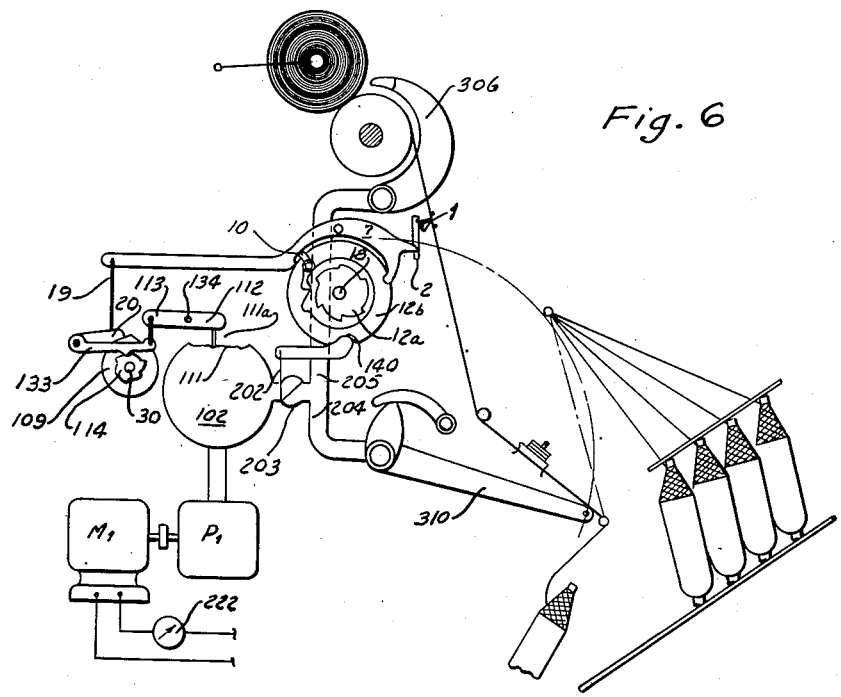
Fig. 6 is a side view of an apparatus according to the present invention.
Figure 7:
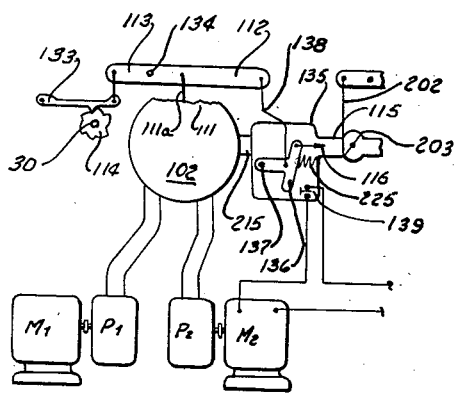
Fig. 7 is a fragmentary view of a modified embodiment.
Figure 8:
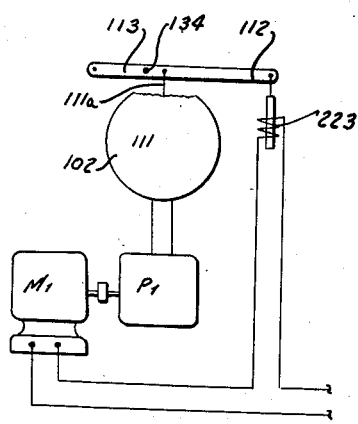
Fig. 8 is a fragmentary view of another modified embodiment of the present invention.

Referring to the drawings and more particularly to Figs. 6–8 these figures show schematically an arrangement carrying out the invention, Figs. 7 and 8 contain a fragmentary view of two other constructions. The arrangement of Fig. 6 comprises an automatically working knotting device. This knotting device is not subject of this application and is disclosed in my application Ser. No. 308,033. The drawing shows the transporters 310 and 306 which have to catch the ends of a broken thread or the thread of a new supply spool, if the supply spool is emptied. Each transporter contains a suction tube, which can be connected with tubes 205, 204 and with a valve 203 leading to a container 102. Every operational station $F_1F_2F_3$ (Fig. 5) is separately connected with same container 102 by means of separate tubes 204, 205 and a valve 203 and every valve of a station can be opened or closed independently from another station. The air of the container 102 is exhausted by a pump $P_1$ driven by the electromotor $M_1$, the electric current of which can be measured with the instrument 222. As soon as the motor runs and the pump evacuates, the pressure in the container 102 decreases. This pressure is measured with the diaphragm 111. The volume of the container is known and constant, therefore the measured pressure states indirectly the energy being available for actuating the suction tubes. To the amount of that energy can be added the energy of the driven pump in the process of exhaustion. This total energy is available. The consumption of the operated suction tubes of the transporters 306 and 310 is also known and it can be calculated how many stations $F_1F_2F_3$ can be run without danger of insufficient energizing. To carry out this, the diaphragm 111 is connected to an arm 111a, a lever 112, 113 pivoting at 134 to a blocking lever 133, arresting the blocking wheel 114 in the inferior position and releasing in the superior position.

By the arrest of the blocking wheel 114 the actuation of any station $F_1F_2$ being at this moment not yet in operation is also stopped. This is only possible after having sufficient decreased pressure to ensure complete operation. As soon as the pressure has the necessary level, the lever 112 drops, the lever 113 and the blocking lever 20 is lifted so that the wheel 114 begins to run setting in revolution the shaft 30 and the cam 109, which lifts the lever 20. This movement of the lever 20 presses the spring 21 (Fig. 1). If at that moment the thread F is broken, the thread feeler 1 is raised and the lever moves down pressed by the spring 21 and by the rod 19. This movement releases the pawl 11, which engages a tooth of the disk 12a and causes the revolution of the disk 12b. This revolution actuates the knotting device, being not subject of this application. The method for ensuring the knotting can be provided according to my patent application Ser. No. 308,033 or in any other known manner. To ensure the connection between the suction tubes 310 and 306 and the container 102 the disk 12b is provided with a groove 140 which engages a lever 201 in stop position. As soon as the disk 12b revolves the lever 201 slides on the surface of the disk and opens the valve 203 by means of the shaft 202. If the knotting is finished during one revolution of the disk 12b the disk 12b is stopped by disengaging the pawl 11 caused by the projection 10. The stoppage of the disk 12b permits the lever 201 to enter into the groove 140 which locks the valve 203. By the embodiment of Fig. 6 only the pressure in the container 102 controls the actuation. The embodiment according to Fig. 7 provides a control of pressure and a control of consumption by measuring the flow of air current. For this purpose a control apparatus is arranged in the general current between the valves 203 and the container 102. This control apparatus 135 comprises a movable member 116 e. g. conically shaped, which pivots a lever 136 at 137 being balanced by a spring 225. The movement of the lever 136 is transmitted to the lever 112. The diaphragm 111 controls also the movement of this lever 112. The proportion of the distances to pivot 134 can be made adjustable.

The pressure sometimes fluctuates in high degree. To meet these fluctuations a second pump P2 with driving motor M2 can be provided for and a switch 139 operated by the lever 136 is arranged in the control apparatus 135.

Another embodiment of the invention is shown in Fig. 8. There the control action and movement of the lever 113, 112 is caused by the electric current of the motor M1. The current of the motor M1 increases in same degree in which the pressure in the container decreases and vice versa.

For this reason an electromagnet 223 is provided for in such way that the lever 112 is lifted at the big current and falls at small current.

Another embodiment provides to combine arrangement of Fig. 5 with the arrangement of Fig. 6.

In view of the fact that the subject matter of the present application is a continuation and a further development of the subject matter disclosed in my Patent 2,679,361, certain structural features illustrated and described therein, as well as the method steps disclosed therein, are also applied in the arrangement of the present application. Particularly, the mechanism disclosed in the parent application for starting an operation is applied in a similar manner in the arrangement of the present application.

It will be understood that each of the elements described above, or two or more together, may also find a useful application in other types of actuation control arrangements for winding machines differing from the types described above.

While the invention has been illustrated and described as embodied in an actuation control means preventing actuation of additional operational stations when the operative operational stations consume all available energy, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for controlling non-continuous independent operations in a textile machine, comprising, in combination, the steps of producing a predetermined amount of energy for carrying out a plurality of independent non-continuous operations, said energy being produced in the form of air accumulated in a container and having a pressure different from the atmospheric pressure; determining before starting an operation an energy component which is a measure of the entire available energy so as to determine whether sufficient energy for the operation is available, said energy component being the flowing stream of air supplied to said container; carrying out at least one energy consuming operation; and preventing starting of further operations when the value of said energy component indicates that said predetermined amount of energy is being consumed by said at least one operation already taking place.

2. A method for controlling non-continuous independent operations in a textile machine, comprising, in combination, the steps of producing a predetermined amount of energy for carrying out a plurality of independent non-continuous operation, said energy being produced by means of an electric motor; carrying out at least one operation; measuring the power consumed by said electric motor, said power being a measure of the available energy so as to determine whether sufficient energy for at least one other operation is available; and preventing starting of another operation when said measured power of said electric motor indicates that said predetermined amount of energy is being consumed by said at least one operation already taking place.

3. A method for controlling independent non-continuous operations, comprising, in combination, the steps of producing a predetermined amount of energy for carrying out independent non-continuous energy consuming operations; determining whether sufficient energy for an operation is available before starting an operation; and automatically increasing the amount of produced energy when insufficient energy is available for an operation.

4. A method for controlling independent non-continuous operations, comprising, in combination, the steps of producing a predetermined amount of energy for carrying out independent non-continuous energy-consuming operations at a plurality of operational stations; consecutively sensing said plurality of operational stations for determining whether an operation is required at any one of said operational stations; carrying out required operations while simultaneously determining whether sufficient energy for each operation is available before starting an operation; and preventing starting of further operations when said predetermined amount of energy is being consumed by operations already taking place at some of said operational stations.

5. An actuation control apparatus comprising, in combination, a source of energy adapted to produce a predetermined amount of energy; a plurality of operational stations, each operational station being supplied with energy from said source of energy for carrying out independent non-continuous energy consuming operations; movable actuating means for actuating said operational stations to carry out said operations; energy checking means continuously checking whether the energy consumed by actuated operational stations exceeds said predetermined amount of energy; and movable operation control means connecting said energy checking means with said actuating means and preventing movement of said actuating means and actuation of operational stations by said actuating means when said energy checking means indicate that the energy consumed by actuated stations reaches said predetermined amount of energy available at said source of energy.

6. An actuation control apparatus comprising, in combination, a source of energy adapted to produce a predetermined amount of energy; a plurality of operational stations, each operational station being supplied with energy from said source of energy for carrying out independent non-continuous energy consuming operations; movable actuating means for consecutively actuating said operational stations to carry out said operations and including drive means and operating means for each operational station, and a plurality of coupling means movable between a coupling position and a disconnecting position, each coupling means connecting in coupling position one of said operating means with said drive means, said actuating means also including cam means for consecutively urging said coupling means into said coupling position; station checking means at each of said operational stations for determining whether an operation is required at the respective station, said station checking means including arresting means cooperating with said coupling means and permitting movement of the same to said coupling position only when an operation is required at the associated operational station; energy checking means continuously checking whether the energy consumed by actuated operational stations exceeds said predetermined amount of energy; and movable operation control means connecting said energy checking means with said actuating means and preventing movement of said actuating means and actuation of operational stations by said actuating means when said energy checking means indicate that the energy consumed by actuated stations reaches said predetermined amount of energy available at said source of energy.

7. An actuation control apparatus as claimed in claim 6 and applied to a thread winding machine, wherein said station checking means include broken thread levers permitting said coupling means to move to said coupling position when a thread breaks.

8. An actuation control apparatus, comprising, in combination, a container means adapted to contain air at a pressure different from the atmospheric pressure; a plurality of operational stations, each operational station being operated by air from said container for carrying out independent non-continuous operations causing a change of pressure in said container means; a rotary sensing shaft carrying a plurality of staggered cams, one cam being provided for each operational station; motion transmitting means connecting each of said cams with one of said operational stations so that said staggered cams consecutively actuate said operational stations; pressure sensitive diaphragm means on said container means checking the pressure in the same; a blocking lever connected to and operated by said diaphragm means to move from an inoperative position to a blocking position when the pressure in said container is insufficient for operating additional operational stations; a blocking wheel fixed on said sensing shaft and being blocked by said blocking lever in said blocking position of the same whereby rotation of said sensing shaft and further actuation of operational stations is prevented.

9. An actuation control apparatus for a winding machine, comprising, in combination, a source of energy adapted to produce a predetermined amount of energy; a plurality of operational stations, each operational station being supplied with energy from said source of energy for carrying out independent non-continuous energy consuming operations; a rotary sensing shaft carrying a plurality of staggered cams, one cam being provided for each operational station; motion transmitting means connecting each of said cams with one of said operational stations so that said staggered cams consecutively actuate said operational stations; a plurality of energy consumption representing means, one energy consumption representing means for each operational station; blocking means movable between a blocking position and a releasing position, and blocking said sensing shaft in said blocking position for preventing actuation of operational stations; and means connecting said energy consumption representing means with said blocking means and moving said blocking means to said blocking position when the consumed energy exceeds a predetermined amount.

10. An actuation control apparatus for a winding machine, comprising, in combination, a source of energy adapted to produce a predetermined amount of energy; a plurality of operational stations, each operational station being supplied with energy from said source of energy for carrying out independent non-continuous energy consuming operations; a rotary sensing shaft carrying a plurality of staggered cams, one cam being provided for each operational station; motion transmitting means connecting each of said cams with one of said operational stations so that said staggered cams consecutively actuate said operational stations; a plurality of parallel electric circuits, one circuit for each of said operational stations, each circuit including an electric resistance and a contact closed by said motion transmitting means when the same are actuated, each of said electric resistances permitting passing of a current corresponding to the energy consumed by the associated operational station; a source of electric current connected to said circuits; an electromagnet means connected in series to said parallel circuits and being energized by a current which is the sum of all currents passing through electric resistances located in circuits in which said contacts are closed, said electromagnet means including a movable member; a pivoted blocking lever connected to said movable member of said electromagnet means, said blocking lever being movable between an inoperative position and a blocking position and being moved to said blocking position when said electromagnet means is energized by the sum of the currents produced by a predetermined number of actuated stations; a blocking wheel fixed on said sensing shaft and being blocked by said blocking lever in said blocking position of the same whereby rotation of said sensing shaft and actuation of operational stations is prevented.

References Cited in the file of this patent
UNITED STATES PATENTS

| 1,843,991 | Smith | Feb. 9, 1932 |
| 2,114,016 | Dimond | Apr. 12, 1938 |
| 2,305,773 | Hagedorn | Dec. 22, 1942 |
| 2,385,061 | Clark | Sept. 18, 1945 |
| 2,679,361 | Furst | May 25, 1954 |